(12) United States Patent
Nagaoka (10) Patent No.: US 7,009,787 B2
(45) Date of Patent: Mar. 7, 2006

(54) PORTABLE IMAGE DISPLAY (75) Inventor: Toshiyuki Nagaoka, Akishima (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/914,285

(22) Filed: Aug. 10, 2004

(65) Prior Publication Data
US 2005/0013006 A1 Jan. 20, 2005

Related U.S. Application Data (62) Division of application No. 09/863,066, filed on May 23, 2001, now Pat. No. 6,791,773.

(30) Foreign Application Priority Data

May 23, 2000 (JP) ............................. 2000-151462

(51) Int. Cl.
G02B 5/04 (2006.01)
(52) U.S. Cl. ..................................... 359/833
(58) Field of Classification Search ................ 359/629, 359/630, 831, 833
See application file for complete search history.

(56) References Cited

U.S. PATENT DOCUMENTS 5,867,795 A  2/1999  Novis et al.
6,085,112 A  7/2000  Kleinschmidt et al.
6,275,714 B1 8/2001  Kintz et al.
6,323,892 B1 11/2001 Mihara
6,486,862 B1 11/2002 Jacobsen et al.

FOREIGN PATENT DOCUMENTS

JP  6-294943  10/1994

Primary Examiner—Euncha P. Cherry
(74) Attorney, Agent, or Firm—Pillsbury Winthrop Shaw Pittman LLP (57) ABSTRACT The object of the invention is to make a viewing unit of the image display compact so that it can be mounted on portable telephones or information terminals. The portable image display of the invention comprises a speaker portion, a microphone portion, an image display device 9 and a viewing optical system for forming an exit pupil to view an image displayed on the image display device and having a generally positive refracting power. The viewing optical system is constructed of at least one prism member 10 comprising an entrance surface through which a light beam emanating from the image display device 9 is entered into the prism, at least one reflecting surface at which the light beam is reflected within the prism and an exit surface through which the light beam leaves the prism. The at least one reflecting surface has a curved surface shape for imparting power to a light beam. The curved surface shape is defined by a rotationally asymmetric surface shape capable of making correction for decentration aberrations.

2 Claims, 12 Drawing Sheets

PORTABLE IMAGE DISPLAY

This is a divisional application of U.S. application Ser. No. 09/863,066. filed on May 23, 2001, now U.S. Pat. No. 6,791,773, and claims benefit of Japanese Application No. 2000-151462, filed on May 23, 2000, the contents of both of which are incorporated herein by reference in their entireties.

BACKGROUND OF THE INVENTION

The present invention relates generally to a portable image display, and more particularly to a portable image display that can be added to portable telephones or portable information terminals.

In recent years, image displays, especially head or face mounted image displays designed to allow individuals to enjoy images on large screens or for other purposes have been under intensive developments. With the recent spread of portable telephones or information terminals, there is also a growing demand for viewing images or textual information on portable telephones or information terminals on large screens.

Among head mounted image displays known so far in the art, there is a display system comprising a CRT or other image display device, an image transmission device for transmitting an image on the image display device to an object plane and a toric reflecting surface for projecting the image on the object plane in the air (see U.S. Pat. No. 4,026,641). There is also available a refraction type image display system comprising a relay optical device for forming an image on a liquid crystal display (LCD) or other image display device in the air, and an eyepiece optical device including a decentered concave mirror for guiding the thus formed image to the eyeball of an observer (see JP-A 06-294943).

However, these systems, because of using a large optical system, are found to be unsuitable for use on portable telephones or information terminals.

SUMMARY OF THE INVENTION

In view of such problems with prior art as mentioned above, an object of the present invention is to make an observation portion of an image display system so compact that it can be mounted on a portable telephone or information terminal.

According to one aspect of the present invention, this object is achieved by the provision of a portable image display having data communication means, which comprises a speaker portion for catching sounds, a microphone portion for picking up sounds, an image display device and a viewing optical system for forming an exit pupil to view an image displayed on the image display device and having a generally positive refracting power, characterized in that:

said viewing optical system is constructed of at least one prism member comprising an entrance surface through which a light beam emanating from said image display device is entered into a prism, at least one reflecting surface at which said light beam is reflected within the prism and an exit surface through which said light beam leaves the prism, wherein said at least one reflecting surface has a curved surface shape for imparting power to a light beam, said curved surface shape being defined by a rotationally asymmetric surface shape capable of making correction for decentration aberrations.

Reference is now made to the action of this arrangement. Especially for a portable image display increasingly required to have smaller size, it is preferable that the optical system for forming an exit pupil and having a positive refracting power is constructed of one prism member having a lens action. By use of one prism member, it is possible to achieve an optical system of smaller size. To obtain satisfactory aberration performance, it is preferable that the prism member comprises an entrance surface through which a light beam emanating from an image display device is entered into a prism, at least one reflecting surface at which the light beam is reflected within the prism and an exit surface through which the light beam leaves the prism, wherein said at least one reflecting surface has a curved surface shape for imparting power to a light beam, said curved surface shape being defined by a rotationally asymmetric surface shape capable of making correction for decentration aberrations.

According to the second aspect of the present invention, there is provided a portable image display having data communication means, which comprises an image display device and a viewing optical system for forming an exit pupil to view an image displayed on the image display device and having a generally positive refracting power, characterized in that:

said viewing optical system comprises a prism portion and a reflecting portion having a reflecting surface, said image display device and said prism portion are received in a body of said portable image display, said reflecting portion is held by a separate frame member, and said frame member is receivable in said body.

Reference is now made to the action of this arrangement. To achieve an optical system of smaller size for a portable image display, it is effective to make use of a reflecting portion held by a frame member receivable in the body thereof. As mentioned above, size reductions may be accomplished by use of one prism member. If the reflecting member having a reflecting surface is designed to be receivable in the body, then the size of the portable image display can be much more reduced.

According to the third aspect of the present invention, there is provided a portable image display having data communication means, which comprises a speaker portion for catching sounds, a microphone portion for picking up sounds, an image display device, a viewing optical system for forming an exit pupil to view an image displayed on the image display device and having a generally positive refracting power, an image pickup device and an image pickup optical system for forming an image on the image pickup device, characterized in that:

said viewing optical system is constructed of at least one prism member.

Reference is now made to the action of this arrangement. The portable image display of the present invention may further comprise an image pickup device and an image pickup optical system for forming an image on the image pickup device. To reduce the entire size of the image display, it is preferable that the viewing optical system is constructed of at least one prism member.

According to the fourth aspect of the present invention, there is provided a portable image display having data communication means, characterized by comprising a first image display device having a pixel pitch Pm, a second image display device having a pixel pitch Pn and a viewing optical system for forming an exit pupil to view an image displayed on the first image display device and having a generally positive refracting power, and satisfying the following condition (1):

$$0.01 < Pm/Pn < 0.8 \tag{1}$$

The action of this arrangement is now explained. With a portable image display, textual or imagewise data on a display device are directly viewed or viewed on an enlarged scale. Especially when images of high definition are viewed through a viewing optical system having a generally positive refracting power on an enlarged scale, it is preferable to make use of an image display device having a fine pixel pitch. For direct viewing of images not through any magnifying optical system, on the other hand, no problem arises even when the pixel pitch is more or less large. Usually, an image display device having a fine pixel pitch is unfavorable in terms of cost. Accordingly, it is preferable to make use of an image display device having a large pixel pitch for direct-view purposes. For these reasons, the present invention uses a direct-view display device and a magnifying display device which satisfy condition (1).

To improve the easy-to-carry capability of the portable image display, it is required to make the magnifying optical system compact. For direct viewing with ease of use, on the other hand, this optical system must have a large display area. To this end the following condition (2) should preferably be satisfied.

$$0.01 < Sm/Sm < 0.5 \tag{2}$$

Here Sm the display area of the magnifying image display device and Sn is the display area of the direct-view image display device.

To allow the portable image display of the present invention to achieve high-definition views of a magnified image with size and cost reductions, it is preferable to satisfy both conditions (1) and (2).

According to the fifth aspect of the present invention, there is provided a portable image display having data communication means, characterized by comprising a data storage means, a means for indicating the end of data reception, an image display device and a viewing optical system for forming an exit pupil to view an image displayed on the image display device and having a generally positive refracting power.

Reference is now made to the action of this arrangement. When an image is viewed through the viewing optical system, the user does not often peer through the viewing optical system during reception of the data to be viewed. Especially when the data are viewed on an enlarged scale, a long-duration view offers user fatigue. For this reason, it is preferable to provide the means for indicating the end of data reception. For instance, the end of data reception may be indicated by allowing a light to come on or a sound.

In the present invention, it is preferable to satisfy condition (1). More preferably, however, the following condition (1–2) should be satisfied.

$$0.03 < Pm/Pn < 0.5 \tag{1–2}$$

In the present invention, it is preferable to satisfy condition (2). More preferably, however, the following condition (2—2) should be satisfied.

$$0.04 < Sm/Sn < 0.3 \tag{2—2}$$

For correction of aberrations, the prism member used for the viewing optical system should preferably comprise at least two surfaces for reflecting a light beam within a prism. Preferably in this case, said at least two surfaces are each defined by a rotationally asymmetric surface shape.

In each of the arrangements according to the present invention, it is preferable to use a data storage means for magnified viewing.

For instance, images transmitted using a communication function are displayed on the image display device, so that they are viewed on an enlarged scale through the viewing optical system. To retrieve the required data or transmit them to separate equipment, it is preferable to provide storage means for storing the desired data.

In each of the arrangements of the present invention, there should preferably be provided a light source for illuminating the image display device and an illumination optical system for illuminating the image display device.

In each of the arrangements of the present invention, it is preferable for energy savings that when a plurality of image display devices are used, the image display devices not in service are not illuminated.

In each of the arrangements of the present invention, it is preferable that when an image on the image display device is viewed, the image is turned on the basis of whether the body of the portable image display is held by the right hand or the left hand.

In each of the arrangements of the present invention, it is preferable that the microphone portion for picking up sounds extends from the body of the portable image display such as a portable telephone.

In each of the arrangements of the present invention, it is preferable that the speaker portion for catching sounds extends from the body of the portable image display such as a portable telephone.

In each of the arrangements of the present invention, it is preferable that the speaker portion, operating portion and magnifying viewing optical system are mounted in order from the top side of the body.

In each of the arrangements of the present invention, it is preferable that a liquid crystal display (LCD) or plasma display may be used for the image display device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The portable image display of the present invention is now explained with reference to some preferred examples.

EXAMPLE 1

Figure 1:
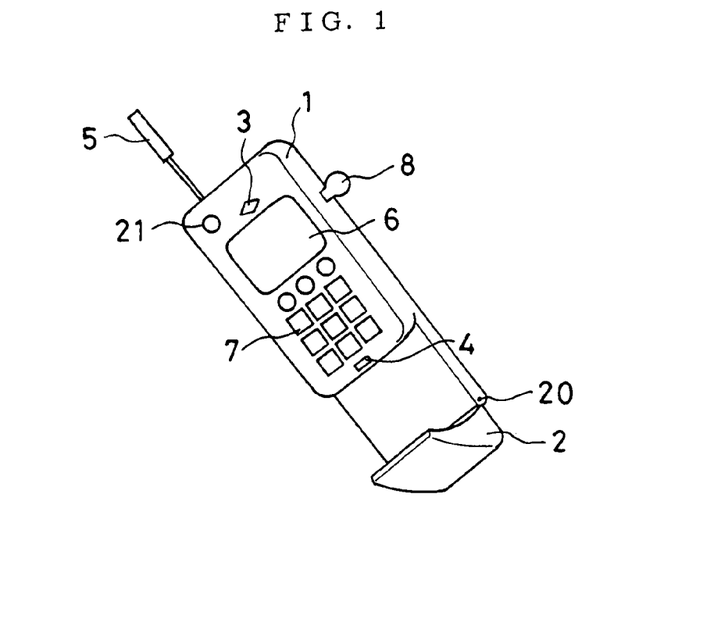
FIG. 1 is a perspective view of the construction of the portable image display according to Example 1 of the invention.

Example 1 is constructed as shown in the perspective view of FIG. 1, wherein 1 indicates a portable image display body, 2 a viewing unit, 3 a speaker portion, 4 a microphone portion, 5 an antenna portion, 6 a direct-view liquid crystal display unit, 7 a set of push buttons, 8 an operating stick portion, and 21 a signal light for indicating the end of data reception. It is here noted that the end of data reception may also be indicated by sounds.

Figure 2:
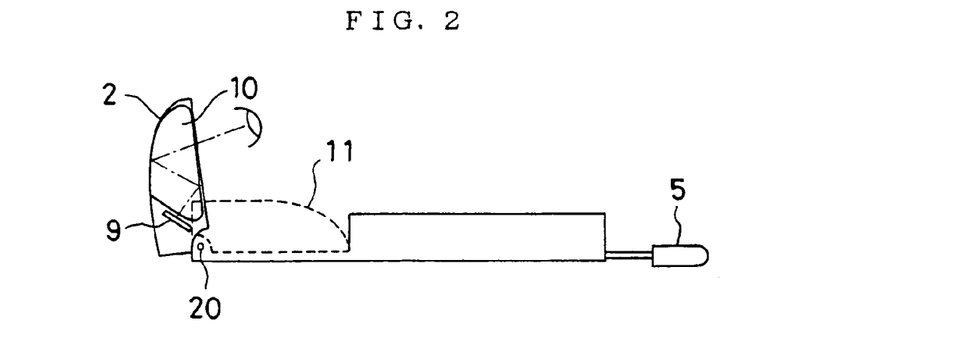
FIG. 2 is a side view illustrative of the construction and action of a viewing unit in Example 1.

As shown in FIG. 2, the viewing unit 2 comprises an LCD or other image display device 9 and a prism member 10 for viewing an image displayed on the image display device. The viewing unit 2 is mechanically connected to the body 1 at a lower site 20 of the body 1 while, when not used as shown by a dotted line 11 in FIG. 2, the viewing unit 2 can be folded down on the body 1, so that a compact portable image display can be achieved.

The viewing unit 2 constructed in such a way that it can be folded down on the body 1 does not only achieve compactness but also ensures that when the viewing unit 2 is not in service, any possible damage to the prism member 10 can be prevented. This is because when the viewing unit 2 is folded down, the exit surface 14 (FIG. 3) of the prism member 10 is positioned in proximity to the body 1 and so is concealed from the outside.

Figure 3:
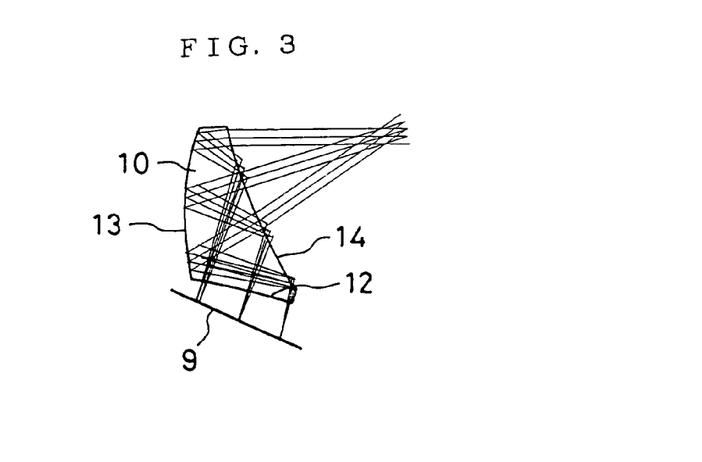
FIG. 3 is an optical path diagram for a viewing optical system used in Example 1.

The prism member 10 used in the viewing optical system comprises, as shown in FIG. 3, an entrance surface 12 for entering a light beam emerging from the image display device 9 into the prism, at least one reflecting surface 13 for reflecting the light beam in the prism, and an exit surface 14 from which the light beam emerges. The reflecting surface has a curved surface shape for imparting power to the light beam. Preferably in this example, the curved surface shape should be defined by a rotationally asymmetric surface shape capable of making satisfactory correction for various decentration aberrations of the prism and making the prism compact. The light beam leaving the image display device 9 is totally reflected at the combined exit and reflecting surface 14 upon transmission through the entrance surface 12, and then reflected at the reflecting surface 13 with an antireflection coating thereon. Finally, the light beam leaves the exit surface in the form of a substantially infinite light beam.

In this example, the viewing unit 2 comprises a magnifying display device 9 and the direct-view display device 6 having such specifications as set out below.

TABLE 1

|  | Pixel Pitch μm | Size (H × V) mm |
|---|---|---|
| Display Device 9 | 0.012 | 9.6 × 7.2 |
| Display Device 6 | 0.25 | 30 × 40 |

Instead of the magnifying display device 9 shown in Table 1, another magnifying display device of 0.038 μm or 0.005 μm in pixel pitch may be used for the portable image display of the invention.

Instead of the direct-view display device 6 shown in Table 1, another direct-view display device of 0.12 μm or 0.058 μm in pixel pitch may be used for the portable image display of the invention.

Instead of the magnifying display device 9 shown in Table 1, another magnifying display device of 4.5×5 mm or 13×15 mm in size may be used for the portable image display of the invention.

Instead of the direct-view display device 6 shown in Table 1, another direct-view display device of 30×20 mm or 30×60 mm in size may be used for the portable image display of the invention.

The portable image display of the invention may additionally comprise an image data storage for viewing stored image data through the viewing unit. The stored image data may be transmitted and received via a communication function.

Especially to reduce the size of the viewing unit 2 likely to become large, the storage should be built in the body 1.

Figure 4:
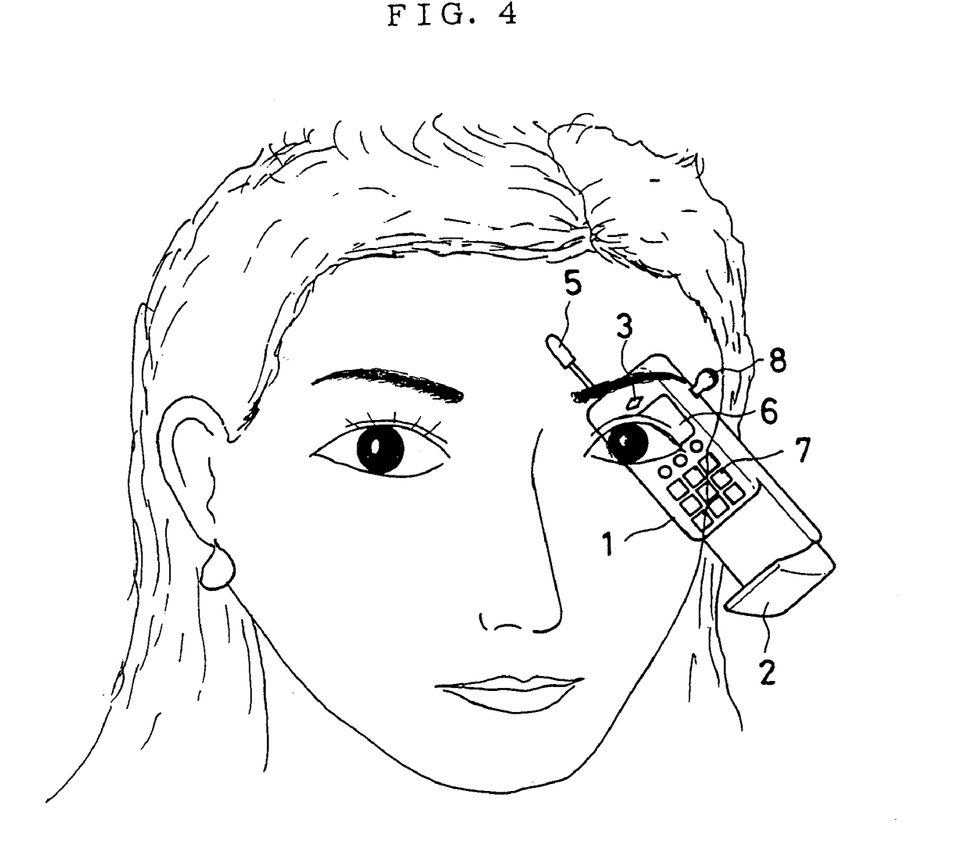
FIG. 4 is a pictorial view illustrative of how to use the portable image display according to Example 1.

As shown in FIG. 4, when viewing image data, it is difficult to manipulate a set of push buttons 7 because the viewing unit 2 must be as close to the eye as possible. It is then preferable to use the operating stick 8. By using the operating stick 7 mounted on the side of the portable image display, operation can be carried out while viewing images through the viewing optical system.

FIG. 4 shows that the portable image display is held with the left hand. However, it is preferable to add a similar operating stick (not shown) on the opposite side of the body so that operation can be carried out even when the portable image display is held with the right hand. It is acceptable to attach one detachable operating stick to each side of the body.

Figure 5:
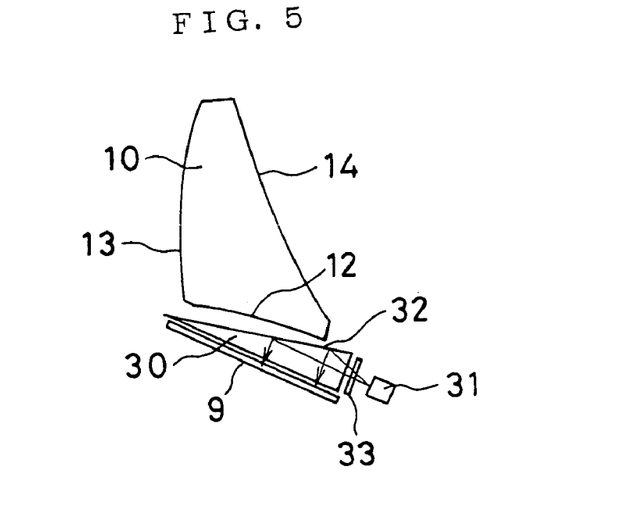
FIG. 5 is illustrative of one example of an illumination optical system for the viewing unit in Example 1.

Referring here to the liquid crystal display device 9 in the viewing unit of the invention, a backlight is used as an illumination means when transmission liquid crystals are used therefor. Thus, when the transmission liquid crystals are used, it is required to use an illumination optical system therewith. It is then preferable to illuminate the liquid crystal display device 9 using a wedge prism, a powered prism or a diffractive element. FIG. 5 shows an example of illumination using a wedge prism, wherein 30 stands for a wedge prism and 31 a light source. A light beam emanating from the light source 31 is shaped through a beam shaping element 33 and then reflected at the slant surface 32 of the wedge prism 30, so that the liquid crystal display unit 9 can be illuminated. The beam shaping element 33 is made up of a refracting lens or diffractive optical element.

EXAMPLE 2

Figure 6:
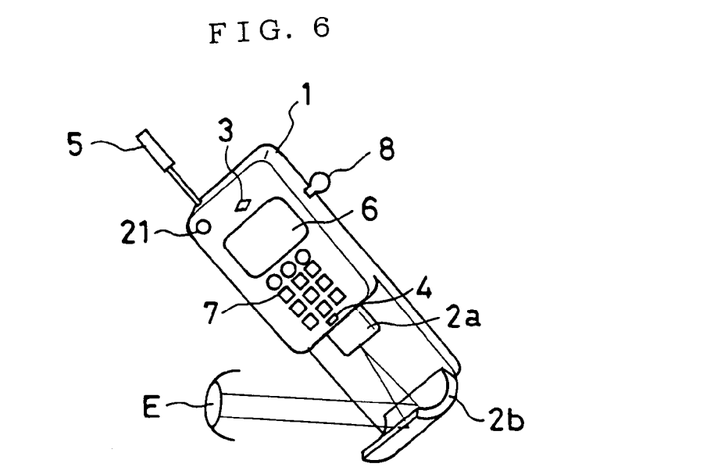
FIG. 6 is a perspective view of the construction of the portable image display according to Example 2 of the invention.
Figure 7:
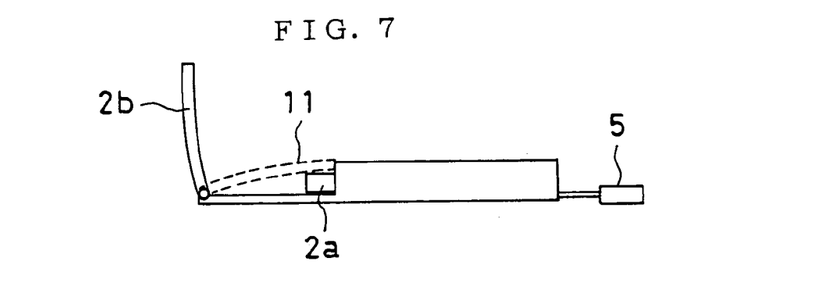
FIG. 7 is a side view illustrative of the construction and action of a viewing unit in Example 2.

Example 2 is constructed as shown in the perspective view of FIG. 6, wherein 1 indicates a portable image display body, 2a a viewing unit body, 2b a reflecting surface of the viewing unit, 3 a speaker, 4 a microphone, 5 an antenna, 6 a liquid crystal display unit, 7 a set of push buttons, 8 an operating stick, and 21 a signal light for indicating the end of data reception. As shown in FIG. 7, the viewing unit body 2a comprises an LCD or other image display device and a prism member for viewing an image displayed on the image display device. The reflecting surface 2b of the viewing unit is made up of one reflecting member. When not used as shown by a dotted line 11 in FIG. 7, the reflecting surface 2b of the viewing unit can be folded down on the body 1, so that a compact portable image display can be achieved.

The viewing unit constructed in such a way that it can be folded down on the body 1 does not only achieve compactness but also ensures that when the body 2a and reflecting surface 2b are not used, any possible damage to and contamination of the reflecting surface 2b can be prevented. This is because when folded down on the body 1, the reflecting surface 12b is positioned in proximity to the body 1 and so is concealed from the outside.

This example comprises a magnifying display device and a direct-view display device 8 having the same specifications as in Table 1 in Example 1.

Figure 8:
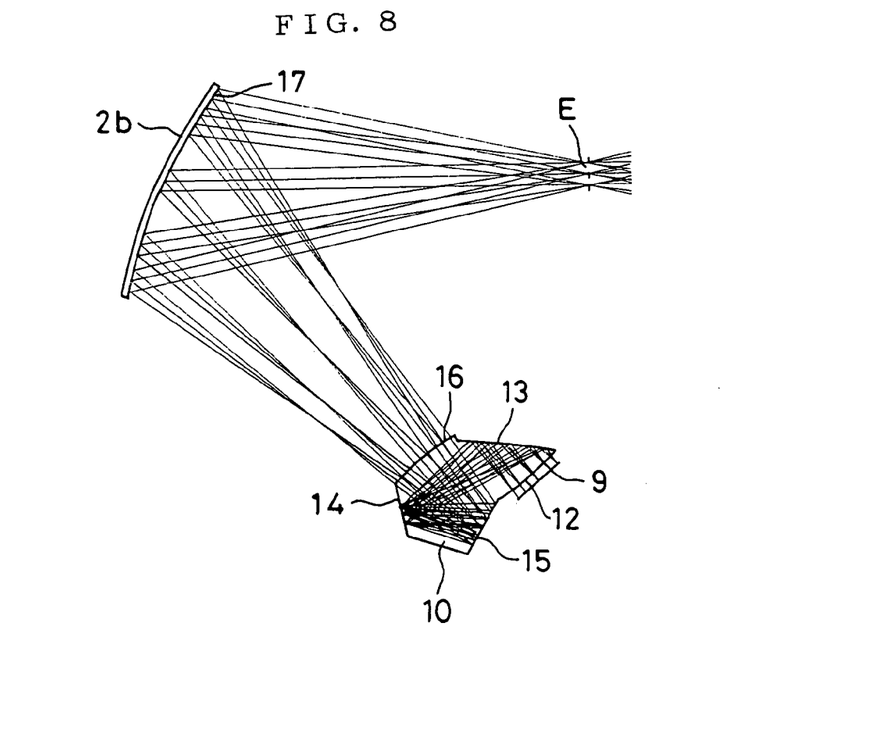
FIG. 8 is an optical path diagram for a viewing optical system used in Example 2.

As shown in FIG. 8, the viewing unit comprises a prism member 10 having an entrance surface 12 for entering a light beam emanating from an image display device 9 into the prism, reflecting surfaces 13, 14 and 15 for reflecting the light beam in the prism and an exit surface 16 through which the light beam leaves. The reflecting surface 14 has a curved surface shape for imparting power to the light beam. Preferably in this example, the curved surface shape should be defined by a rotationally asymmetric surface shape capable of making satisfactory correction for various decentration aberrations of the prism and making the prism compact. After leaving the exit surface 16, the light beam is reflected at the reflecting surface 17 of the reflecting surface 2b of the viewing unit to form an exit pupil E. The light beam also forms a primary image halfway between the exit surface 16 and the reflecting surface 17. These are combined together to make the prism member 10 compact.

The reflecting surface 17 has a curved surface shape for imparting power to the light beam. Preferably in this example, the curved surface shape should be defined by a rotationally asymmetric surface shape capable of making satisfactory correction for various decentration aberrations of the prism and making the prism compact.

The portable image display according to this example of the invention may additionally comprise an image data storage for viewing stored image data through the viewing unit. The stored image data may be transmitted and received via a communication function.

Especially to reduce the size of the viewing unit likely to become large, the storage should be built in the body 1.

As in Example 1, when viewing image data, it is difficult to manipulate a set of push buttons 7 because the viewing unit 2 must be as close to the eye as possible. It is then preferable to use the operating stick 8. By using the operating stick 7 mounted on the side of the portable image display, operation can be carried out while viewing images through the viewing optical system.

As in Example 1, it is preferable to add a similar operating stick (not shown) on the opposite side of the body so that operation can be carried out even when the portable image display is held with either one of the right and left hands. It is acceptable to attach one detachable operating stick to each side of the body.

In this example, too, the liquid crystals in the viewing unit may be illuminated as in Example 1.

EXAMPLE 3

Figure 9:
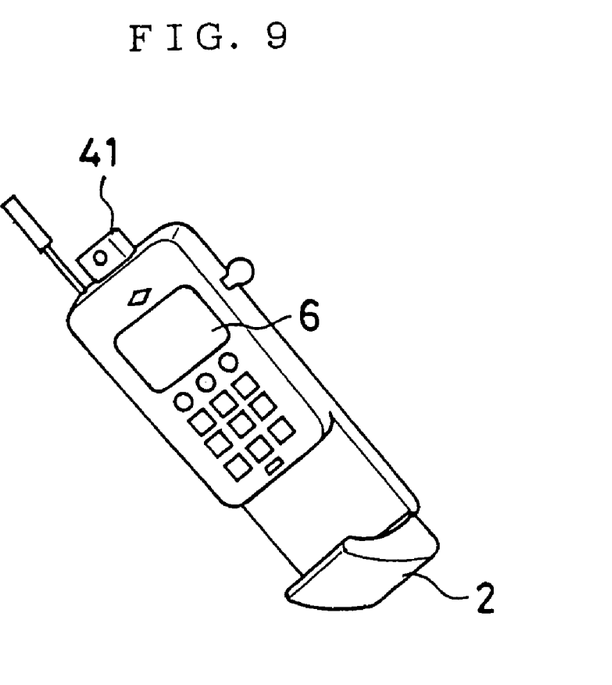
FIG. 9 is a perspective view illustrative of the construction of the portable image display according to Example 3 of the invention.

Example 3 is constructed as shown in the perspective view of FIG. 9. In this example, an image pickup optical system 41 is added to the portable image display of Example 1. The image pickup optical system 42 comprises an image pickup lens having a generally positive refracting power and a CCD or other image pickup device, so that any desired image can be phototaken. The phototaken image can be viewed through the liquid crystal display device 6, and the viewing unit 2 as well. Using data communication means, the phototaken image data may be transmitted to other receiver.

Figure 10:
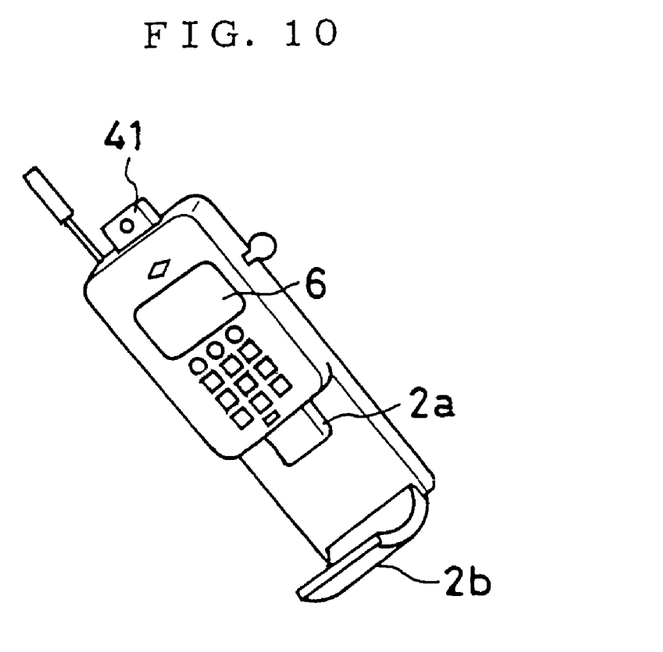
FIG. 10 is a perspective view illustrative of the construction of another embodiment of the portable image display according to Example 3 of the invention.

FIG. 10 is illustrative of a modification to Example 2, wherein an image pickup optical system 41 is added to the portable image display of Example 2.

Herein, the image pickup optical system 41 is positioned at the upper site of the portable image display. However, it is appreciated that the image pickup optical system 41 may be disposed at any desired site of the portable image display. It is acceptable to mount the image pickup optical system 41 on the image display body in a detachable manner.

EXAMPLE 4

Figure 11:
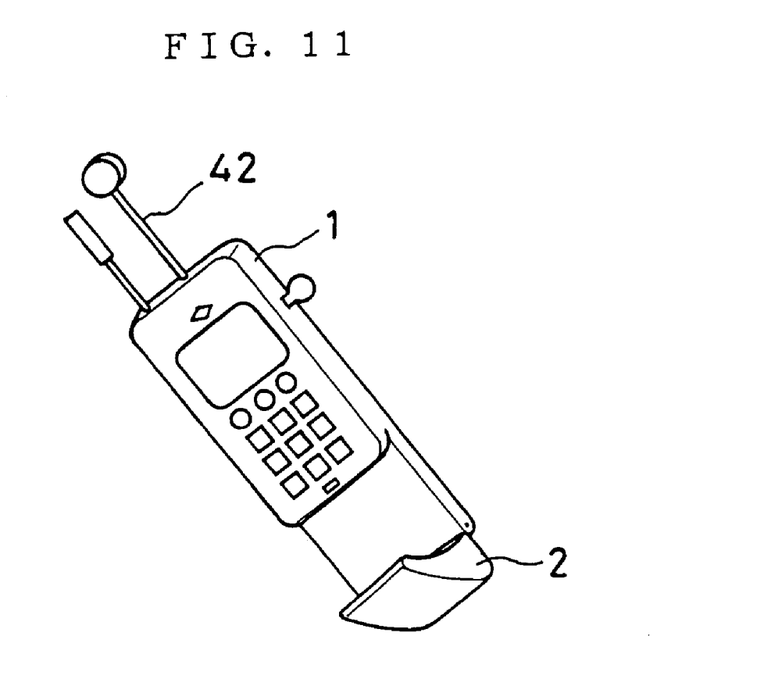
FIG. 11 is a perspective view illustrative of the construction of the portable image display according to Example 4 of the invention.

Example 4 is constructed as shown in the perspective view of FIG. 11, wherein a pop-up speaker 42 is mounted on the portable image display body 1 of Example 1. When the size of the portable image display of the invention is too much reduced, the distance between the viewing unit 2 and the speaker becomes too short or while the eye is brought nearer to the viewing unit 2, the speaker is too far away from the ear to catch sounds from the speaker. This inaudible problem can be solved by providing such a pop-up speaker 42 on the body 1 as shown in FIG. 11.

This example may be applied to the portable image display of Example 2.

EXAMPLE 5

Figure 12:
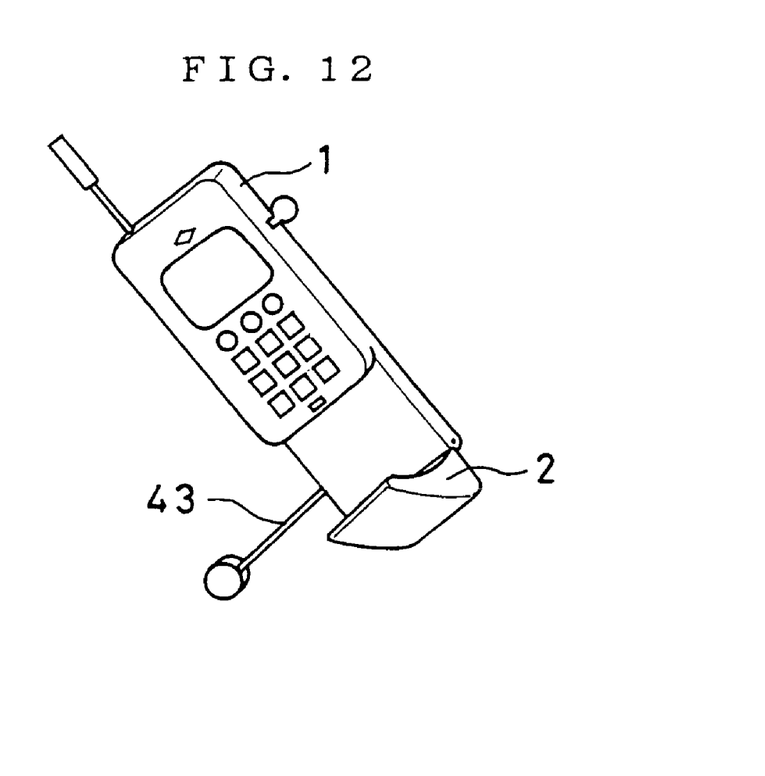
FIG. 12 is a perspective view illustrative of the construction of the portable image display according to Example 5 of the invention.

Example 5 is constructed as shown in the perspective view of FIG. 12, wherein a pop-up microphone 43 is mounted on the portable image display body 1 of Example 1. When the size of the portable image display of the invention is too much reduced, the distance between the viewing unit 2 and the microphone is too short or while the eye is brought nearer to the viewing unit, the distance between the microphone and the mouth is too long to achieve sufficient transmission of sounds to the microphone. This problem can be solved by providing such a pop-up microphone 43 on the body 1, as shown FIG. 12.

This example may be applied to the portable image display of Example 2.

EXAMPLE 6

Example 6 is directed to prism members 10 used for the viewing optical system and constructed as shown in FIGS. 13 to 20. More specifically, this example is directed to further embodiments of the viewing optical system of Example 1. In these drawings, reference numeral 10 indicates a prism member, 9 stands for a liquid crystal or other image display device, and E represents an exit pupil position. These prism members may be used for the viewing optical system of the invention, as briefly explained below.

Figure 13:
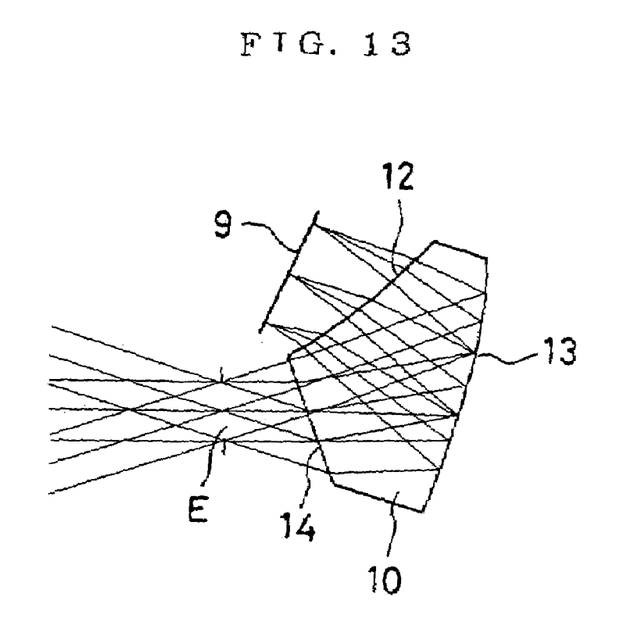
FIG. 13 is an optical path diagram for another embodiment of the optical system usable for the viewing optical system according to Example 1.

Referring to FIG. 13, the prism member 10 comprises a first surface 12, a second surface 13 and a third surface 14. A light beam emanating from the image display device 9 enters the prism member 10 upon refraction at the first surface 12, and reaches the second surface 13 whereat the light beam is internally reflected. Then, the reflection light enters the third surface 14 whereat it is refracted, leaving the exit pupil E in the form of a substantially infinite light beam.

Figure 14:
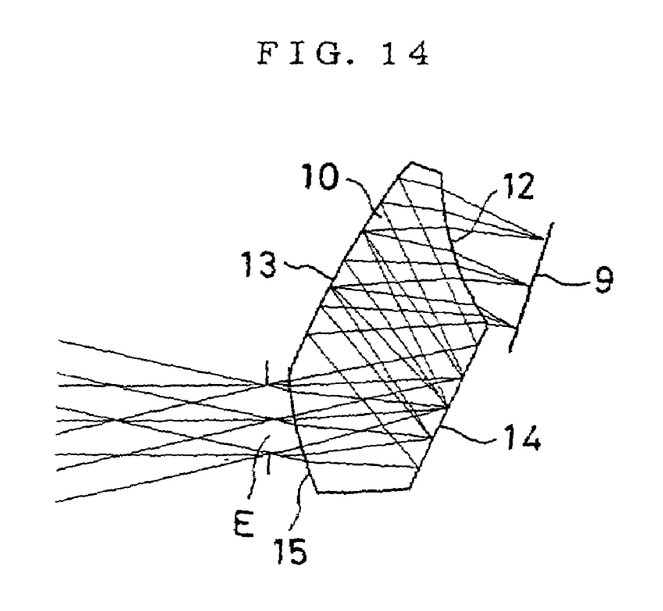
FIG. 14 is an optical path diagram for yet another embodiment of the optical system usable for the viewing optical system according to Example 1.

Referring to FIG. 14, the prism member 10 comprises a first surface 12, a second surface 13, a third surface 14 and a fourth surface 15. A light beam emanating from the image display device 9 enters the prism member 10 upon refraction at the first surface 12, and reaches the second surface 13 whereat it is internally reflected. Then, the reflection light arrives at the third surface 14 whereat it is internally reflected, and enters the fourth surface 15 whereat the reflection light is refracted, leaving the exit pupil E in the form of a substantially infinite light beam.

Figure 15:
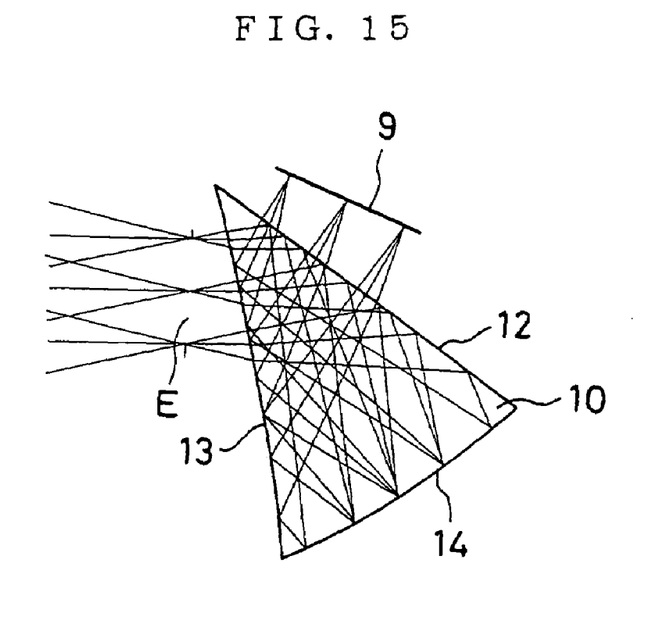
FIG. 15 is an optical path diagram for a further embodiment of the optical system usable for the viewing optical system according to Example 1.

Referring to FIG. 15, the prism member 10 comprises a first surface 12, a second surface 13 and a third surface 14. A light beam emanating from the image display device 9 enters the prism member 10 upon refraction at the first surface 12, and reaches the second surface 13 whereat the refraction light is totally reflected. The reflection light enters the third surface 14 whereas it is internally reflected, and goes back to the first surface 12 whereat the reflection light is now totally reflected. The reflection light goes back to the second surface 13 whereas it is now refracted, leaving through the exit pupil E in the form of a substantially infinite light beams.

Figure 16:
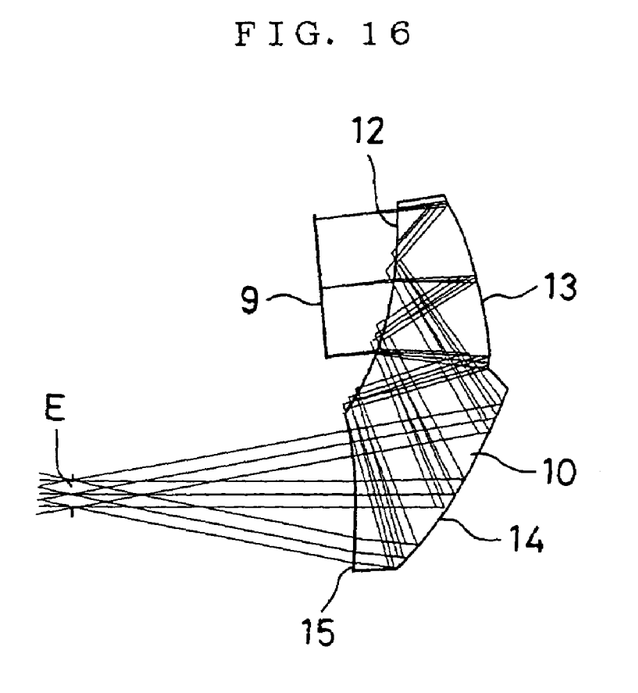
FIG. 16 is an optical path diagram for a further embodiment of the optical system usable for the viewing optical system according to Example 1.

Referring to FIG. 16, the prism member 10 comprises a first surface 12, a second surface 13, a fourth surface 14 and a fourth surface 15. A light beam emitted from the image display device 9 enters the prism member 10 upon refraction at the first surface 12, and reaches the second surface 13 for internal reflection thereat. The reflection light goes back to the first surface 12 whereat it is totally reflected, and the reflection light enters the third surface 14 for internal reflection thereat. The reflection light enters the fourth surface 15 whereat it is refracted, leaving through the exit pupil E in the form of a substantially infinite light beam.

Figure 17:
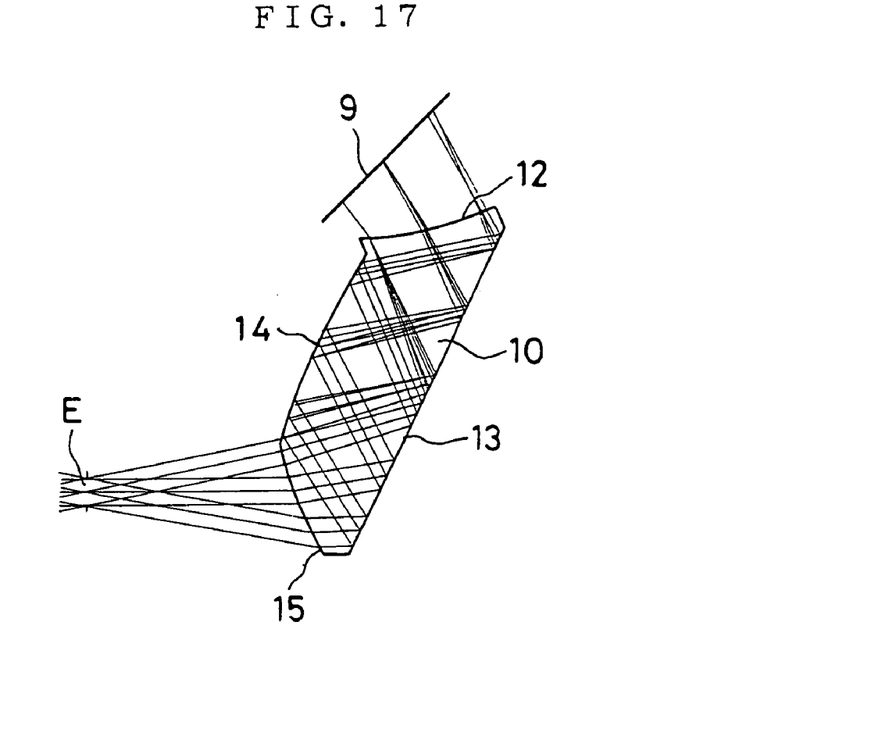
FIG. 17 is an optical path diagram for a further embodiment of the optical system usable for the viewing optical system according to Example 1.

Referring to FIG. 17, the prism member 10 comprises a first surface 12, a second surface 13, a third surface 14 and a fourth surface 15. A light beam emitted from the image display device 9 enters the prism member 10 upon refraction at the first surface 12, and arrives at the second surface 13 for internal reflection thereat. The reflection light enters the third surface 14 whereat it is internally reflected. The reflection light goes back to the second surface 13 for internal reflection thereat, and enters the fourth surface 15 for refraction thereat, leaving through the exit pupil E in the form of a substantially infinite light beam.

Figure 18:
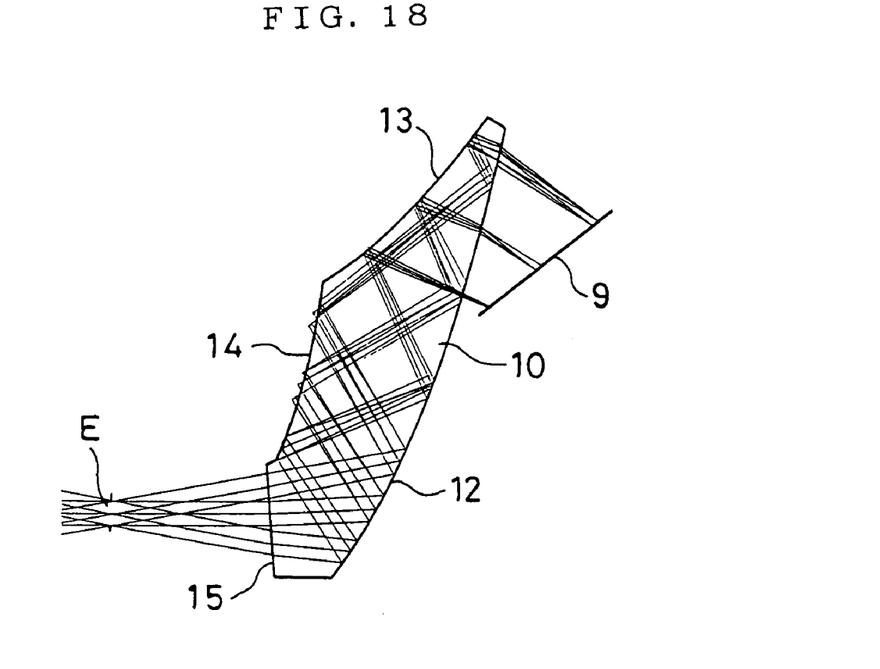
FIG. 18 is an optical path diagram for a further embodiment of the optical system usable for the viewing optical system according to Example 1.

Referring to FIG. 18, the prism member 10 comprises a first surface 12, a second surface 13, a third surface 14 and a fourth surface 15. A light beam emanating from the image display device 9 enters the prism member 10 upon refraction at the first surface 12, and arrives at the second surface 13 for internal reflection thereat. The reflection light goes back to the first surface 12 for total reflection thereat, and the total reflection light enters the third surface 14 whereat it is internally reflected. Then, the reflection light goes back to the first surface 12 for total reflection thereat. Finally, the total reflection light enters the fourth surface 15 for refraction thereat, leaving through the exit pupil E in the form of a substantially infinite light beam.

Figure 19:
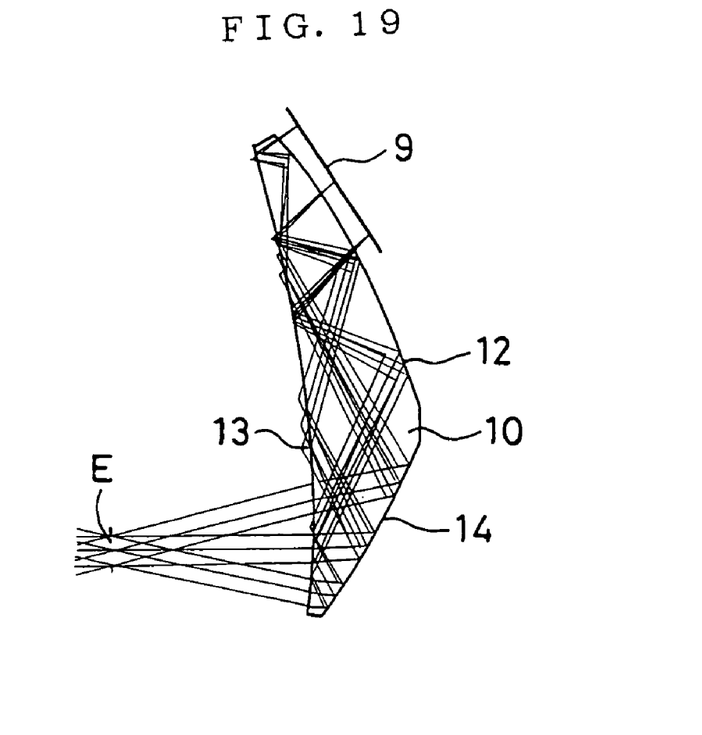
FIG. 19 is an optical path diagram for a further embodiment of the optical system usable for the viewing optical system according to Example 1.

Referring to FIG. 19, the prism member 10 comprises a first surface 12, a second surface 13 and a third surface 14. A light beam coming from the image display device 9 enters the prism member upon refraction at the first surface 12, and reaches the second surface 13 for internal reflection thereat. The internal reflection light goes back to the first surface 12 for total reflection thereat, and arrives at the second surface 13 whereat it is totally reflected. Finally, the total reflection light again goes back to the second surface 13 for refraction thereat, leaving through the exit pupil E in the form of a substantially infinite light beam.

Figure 20:
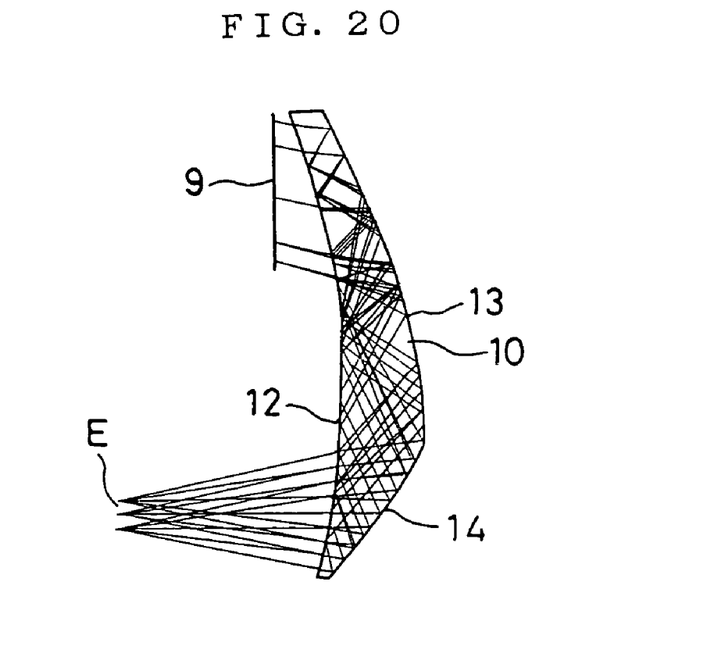
FIG. 20 is an optical path diagram for a further embodiment of the optical system usable for the viewing optical system according to Example 1.

Referring to FIG. 20, the prism member 10 comprises a first surface 12, a second surface 13 and a third surface 14. A light beam emitted from the image display device 9 enters the prism member 10 upon refraction at the first surface 12, and reaches the second surface 13 for total reflection thereat. The total reflection light goes back to the first surface 12 for total reflection thereat, and again reaches the second surface 13 for total reflection thereat. The total reflection light goes back to the first surface 12, and again arrives at the second surface for total reflection (third time) thereat. The total reflection light goes back to the first surface 13 for total reflection (third time). Finally, the total reflection light enters the third surface 14 for internal reflection thereat, and goes back to the first surface 12 whereat it is now refracted, leaving through the exit pupil E in the form of a substantially infinite light beam.

EXAMPLE 7

Example 7 is directed to further embodiments of the viewing optical system of Example 2, as constructed in FIGS. 21 to 25. In these drawings, reference numeral 10 indicates a prism member, 17 shows a reflecting surface, 9 stands for a liquid crystal or other image display device, and E represents an exit pupil position. The prism member 10 and reflecting surface 17 may be used for the viewing optical system of the invention, as briefly explained below.

Figure 21:
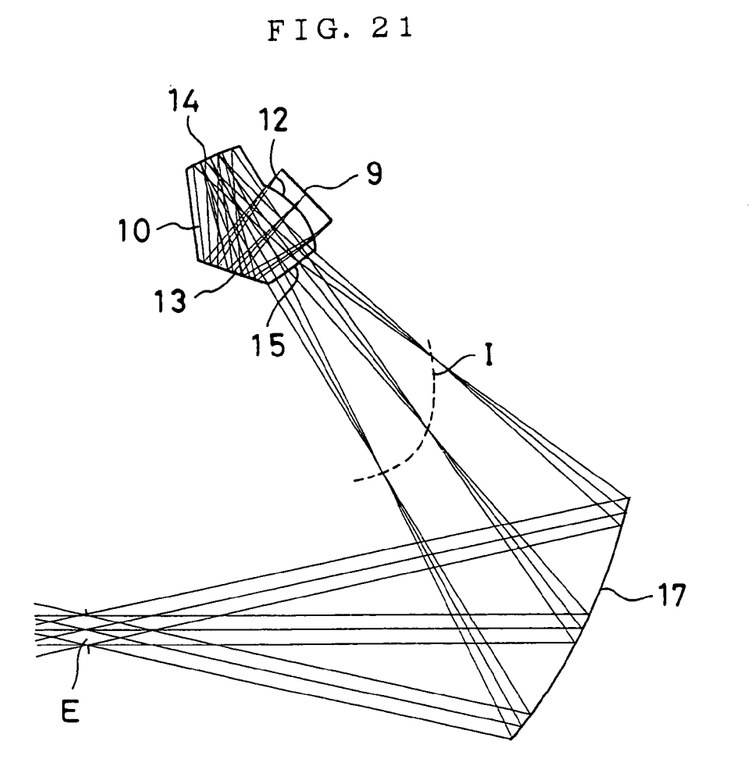
FIG. 21 is an optical path diagram for another embodiment of the optical system usable for the viewing optical system according to Example 2.
Figure 24:
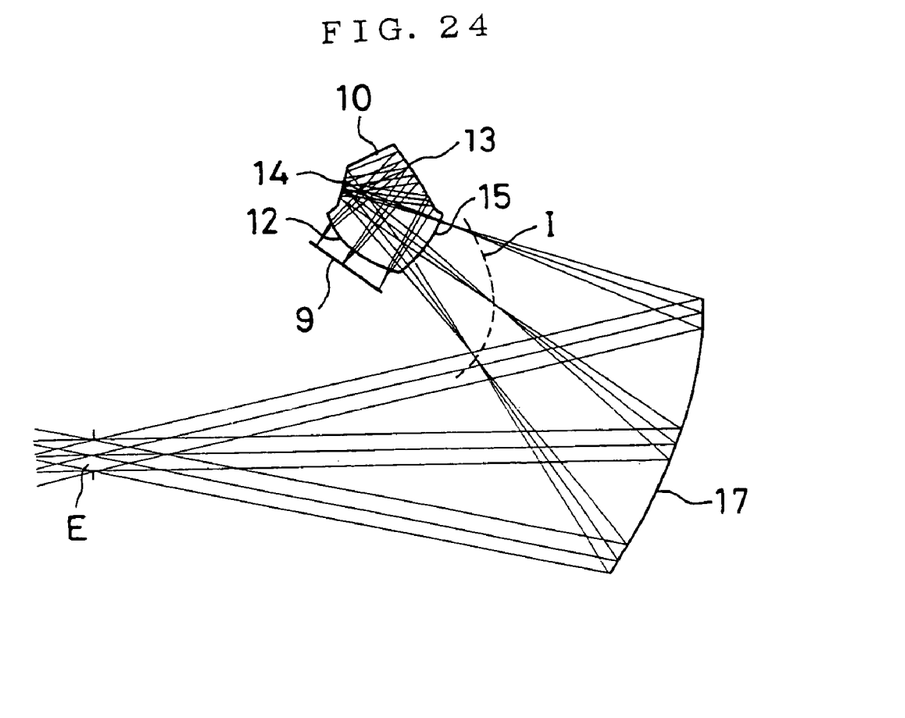
FIG. 24 is an optical path diagram for a further embodiment of the optical system usable for the viewing optical system according to Example 2.

Referring each of FIGS. 21 and 24, the prism member 10 comprises a first surface 12, a second surface 13, a third surface 14 and a fourth surface 15. A light beam emitted from the image display device 9 enters the prism member 10 upon refraction at the first surface 12. Then, the refraction light reaches the second surface 13 for internal reflection, and arrives at the second surface 14 for internal reflection thereat. Then, the internal reflection light enters the fourth surface 15 for refraction thereat, leaving the prism member 10 to form an intermediate image on a primary image-formation plane I. Thereafter, the light is reflected at the reflecting surface 17, leaving through the exit pupil E in the form of a substantially infinite light beam.

Figure 22:
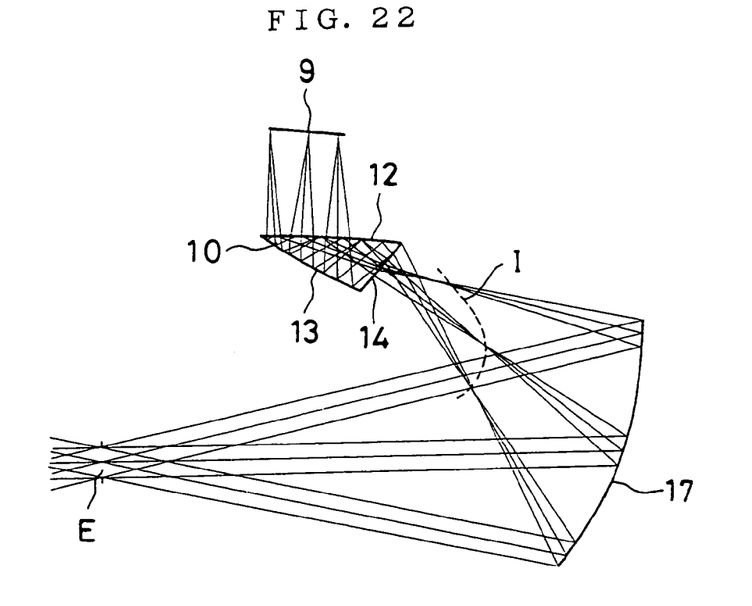
FIG. 22 is an optical path diagram for a further embodiment of the optical system usable for the viewing optical system according to Example 2.
Figure 23:
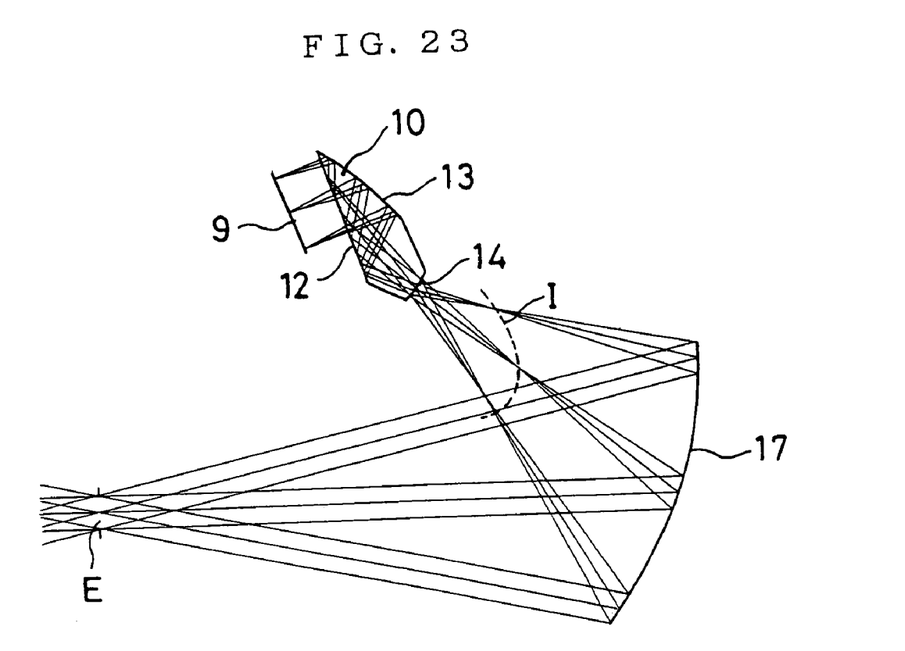
FIG. 23 is an optical path diagram for a further embodiment of the optical system usable for the viewing optical system according to Example 2.

Referring to each of FIGS. 22 and 23, the prism member 10 comprises a first surface 12, a second surface 13 and a third surface 14. A light beam emanating from the image display device 9 enters the prism member 10 upon refraction at the first surface 12. Then, the refraction light reaches the second surface for internal reflection thereat, and goes back to the first surface 12 whereat it is now totally reflected. Then, the total reflection light enters the third surface 14 for refraction thereat, leaving the prism member 10 to form an intermediate image on a primary image-formation plane I. Thereafter, the light is reflected at the reflecting surface 17, leaving through the exit pupil E in the form of a substantially infinite light beam.

Figure 25:
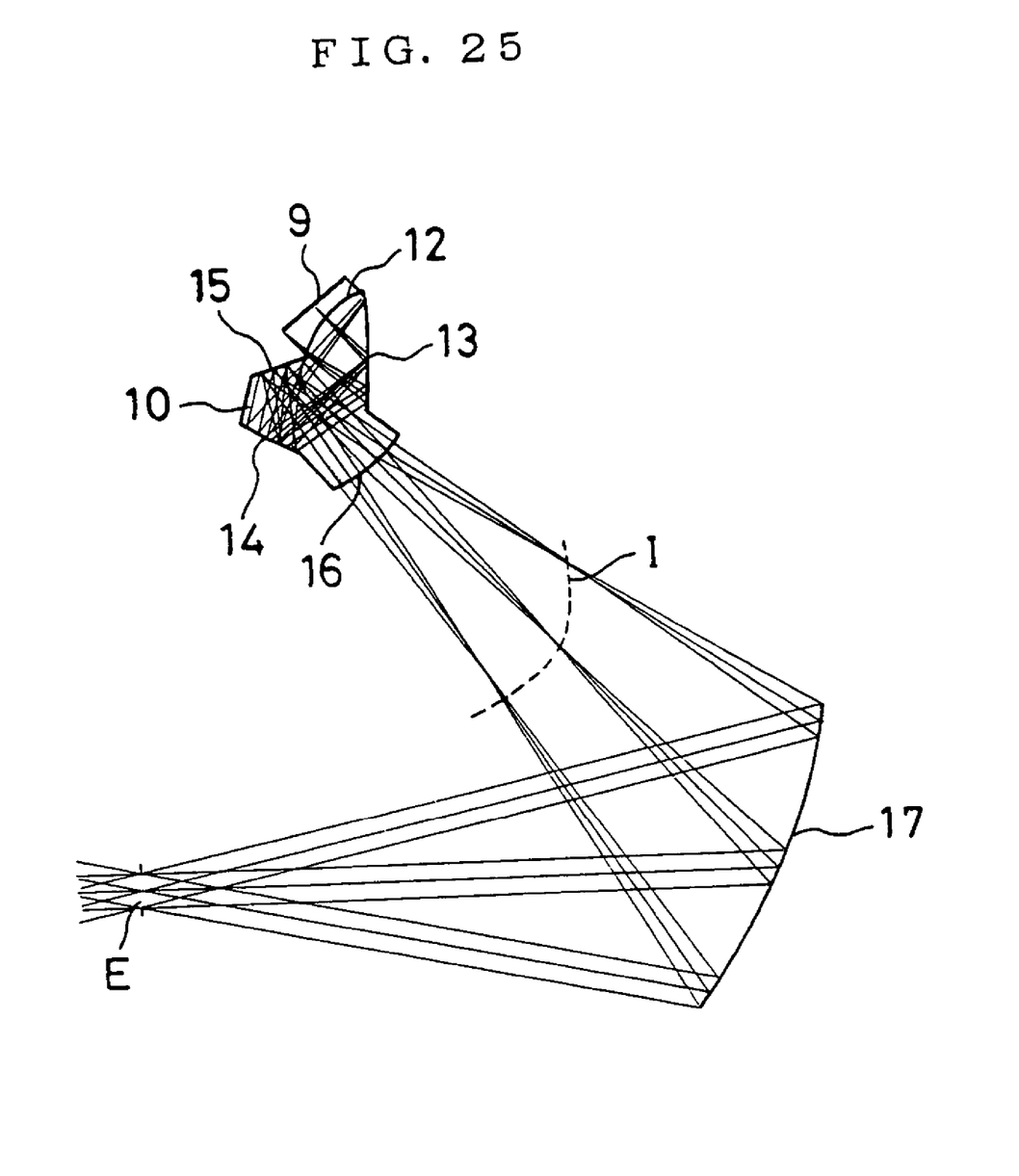
FIG. 25 is an optical path diagram for a further embodiment of the optical system usable for the viewing optical system according to Example 2.

Referring to FIG. 25, the prism member 10 comprises a first surface 12, a second surface 13, a third surface 14, a fourth surface 15 and a fifth surface 16. A light beam emitted from the image display device 9 enters the prism member 10 upon refraction at the first surface 12. Then, the refraction light reaches to the second surface 13 for internal reflection thereat, and arrives at the third surface 14 for internal reflection thereat. Then, the internal reflection light reaches the fourth surface 15 for internal reflection thereat, and enters the fifth surface 16 for refraction thereat, leaving the prism member 10 to form an intermediate image on a primary image-formation plane I. Thereafter, the light is reflected at the reflecting surface 17, leaving through the exit pupil E in the form of a substantially infinite light beam.

While the portable image display of the present invention has been described with reference to some preferred embodiments, it is appreciated that the present invention is not necessarily limited thereto; various modifications may be added thereto.

As can be seen from the foregoing explanations, the present invention can provide a portable image display wherein the viewing unit thereof can be made so compact that it can be mounted on portable telephones or information terminals.

What is claimed is:

1. A portable image display having data communication means, which comprises a first image display device having a pixel pitch Pm, a second image display device having a pixel pitch Pn and a viewing optical system for forming an exit pupil to view an image displayed on the first image display device and having a generally positive refracting power, and satisfies the following condition (1):

$$0.01 < Pm/Pn < 0.8 \qquad (1).$$

2. The portable image display according to claim 1, which further satisfies the following condition (2):

$$0.01 < Sm/Sn < 0.5 \qquad (2)$$

where Sm is a display area of said first image display device, and Sn is a display area of said second image display device.

* * * * *